July 13, 1937.  E. J. MULLEN  2,086,733

PRODUCTION OF SULPHUR DIOXIDE

Filed July 1, 1932

INVENTOR
Edwin J. Mullen.
BY
ATTORNEY

Patented July 13, 1937

2,086,733

UNITED STATES PATENT OFFICE 2,086,733

PRODUCTION OF SULPHUR DIOXIDE

Edwin J. Mullen, New Rochelle, N. Y., assignor to General Chemical Company, New York, N. Y., a corporation of New York Application July 1, 1932, Serial No. 620,399

4 Claims. (Cl. 23—177)

This invention relates to methods and apparatus for the production of gas mixtures rich in sulphur dioxide, and is more particularly directed to the formation of sulphur dioxide by reduction of sulphuric acid contained in acid sludges constituting waste products of various oil refining processes.

Acid sludges contain relatively large quantities of sulphuric acid. This sludge presents problems both with respect to disposal of the sludge where no attempt is made to recover the acid content thereof, and also in connection with the provision of satisfactory processes for separating and recovering sulphuric acid from the sludge. Numerous processes have been suggested for treating acid sludges for the separation and recovery of sulphuric acid as such. Other proposals have been made directed to the recovery from acid sludges of sulphur compounds as sulphur dioxide and the subsequent utilization of the same in the production of sulphuric acid.

The present invention contemplates the recovery of sulphur compounds from acid sludges by decomposing the sludge by heating with the formation of a gas mixture rich in sulphur dioxide gas, and the production of residual coke. Decomposition of relatively thin layers of the sludge and the reduction of sulphuric acid to sulphur dioxide is effected in an endothermic reaction requiring the utilization of considerable quantities of extraneous heat. While methods for decomposing acid sludges by heat treatments to recover sulphur as sulphur dioxide have been suggested, the processes of the present invention constitute improvements in the art, and provide methods whereby the decomposition of acid sludge may be effected in a continuous, economical manner.

The principal object of the invention lies in the provision of processes for the recovery of sulphur compounds from acid sludges carried out in such manner that the sludge is decomposed while maintaining the same in a relatively quiescent layer, and the endothermic reaction involved is rendered continuous and self-sustaining, requiring the utilization of no extraneous heat other than that generated by burning carbonaceous matter constituting residual solid end product of the decomposition reaction itself. According to one preferred embodiment of the invention, acid sludge is continuously fed onto a bed of coke on a hearth so that the sludge is distributed over the surface of the coke bed. The hearth is moved through an externally heated reaction zone or chamber from which any substantial quantities of oxygen are excluded, and the rate of movement of the hearth is so regulated that during passage of the hearth and the sludge thereon through the reaction zone, decomposition of the sludge is substantially complete. Preferably coke is continuously withdrawn from the hearth in such manner as to maintain a bed of coke thereon, and coke so withdrawn from the hearth is fed to a fuel bed in a combustion chamber adjacent the reaction zone, the coke being burned in heat exchange relation with the sludge undergoing decomposition in the reaction zone. The decomposition of sludge and the production of sulphur dioxide therefrom is thus effected in a continuous manner, and coke produced is utilized to generate extraneous heat required by the decomposition reaction.

Further objects and features of novelty will be apparent from a consideration of the following description taken in connection with the accompanying drawing in which,—

Figure 1:
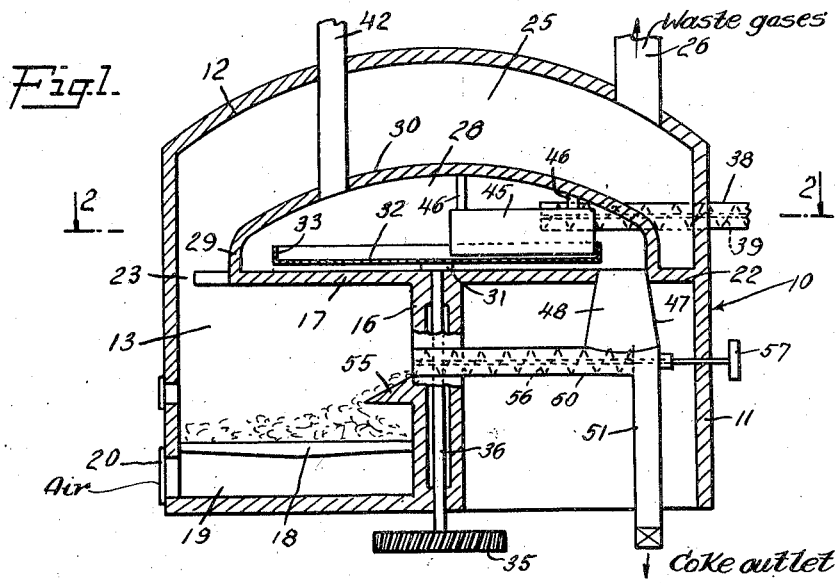
Figure 1 is a vertical section taken on the line 1—1 of Fig. 2, of a preferred embodiment of apparatus constituting one part of the invention.

Referring to Fig. 1 of the drawing, the reference numeral 10 indicates generally a sludge acid decomposing furnace comprising a vertically disposed, preferably cylindrical outer shell 11, and an arched top 12, both constructed of suitable refractory material. A combustion chamber 13, substantially semicircular in horizontal section, is formed by the lower portion of the left half of shell 11, a vertical wall 16 extending diametrically across the interior of shell 11, and the underside of part of a horizontal circular partition 17. A grate 18 in the combustion chamber, spaced upwardly from the base of the furnace, provides an ash pit 19 into which air for supporting combustion of fuel on the grate is admitted through suitable dampers in the clean-out doors 20.

Figure 2:
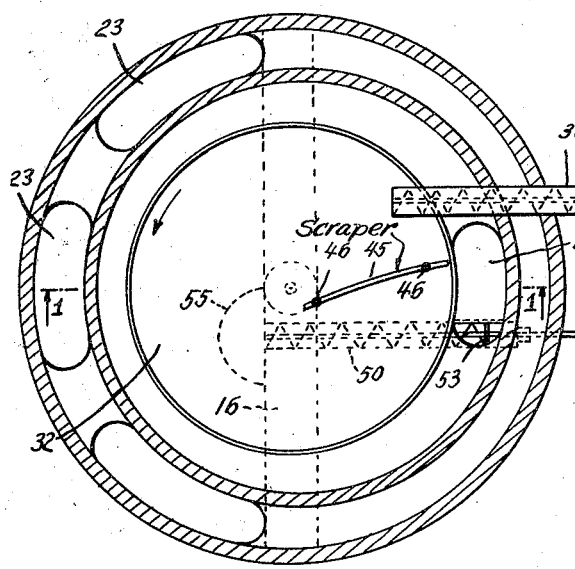
Fig. 2 is a horizontal section taken substantially on the line 2—2 of Fig. 1.

The circular partition 17 is supported centrally by the vertical wall 16, and circumferentially by the outer shell 11 to which the partition is connected as indicated at 22. As shown in Fig. 2, the periphery of the left half of partition 17 above the combustion chamber 13 is provided with a series of arcuate openings 23 which permit passage of hot gases from the combustion chamber into the space 25 underneath the top 12. Spent gases are discharged from the furnace through the flue 26, the lower end of which opens into chamber 25. A muffle 28 is formed by the larger portion of the upper surface of partition 17, a short cylindrical wall 29 resting on and projecting upwardly from the partition, and an arched dome 30. In the modification of apparatus shown in Figs. 1 and 2, it will be seen the construction is such that the hot gases from combustion chamber 13 are excluded from the muffle 28 which is externally heated.

Rotatably mounted in the muffle on a bearing 31 is a circular cast iron hearth 32 having a flange 33 extending upwardly from the periphery thereof. The hearth is supported principally by the vertical partition 16, and is rotated by any suitable means through gear 35 and shaft 36 extending through partition 16. Acid sludge or other material to be treated or decomposed on the hearth 32 is fed into the furnace through an inlet 38 which may be either a valve-controlled pipe, or may include therein a screw conveyor 39, according to whether the material to be charged is free flowing or is a heavy semi-liquid. Gases evolved by the decomposition reaction effected on the hearth are withdrawn from the muffle through an outlet conduit 42 opening into the muffle and passing through the top of the arched top 12.

A substantially continuous discharge of residual solid material from the hearth 32 is effected by an arcuate scraper or deflecting member 45 shown in elevation in Fig. 1, and in plan in Fig. 2. The deflector 45 is supported and maintained in a fixed position by rods 46 set into the arch 30 of the muffle 28. The scraper is spaced from the hearth 32 so as to permit the maintenance thereon of a bed of residual material having a depth corresponding to the distance between the lower edge of the deflector and the surface of the hearth.

The upper end of shell 47 of the hopper 48, projects through an arcuate opening 49 in the partition 17 thus affording communication between the hopper and the interior of the muffle 28. The relative position of the opening 49 in the partition, the edge of the rotary hearth, and the scraper 45 is clearly indicated in Fig. 2. From the arrangement shown, it will be apparent that solid material may be continuously discharged from the upper surface of the bed of solid material on the hearth 32 into the hopper 48.

The shell 47 of the hopper is formed so as to direct solid material into the inlet end of a conduit 50, and into the upper end of a discharge chute 51 separated from conduit 50 by a vertical partition 53 shown in Fig. 2. The outlet end of conduit 50 extends through the vertical wall 16, and discharges material onto the downwardly sloping surface of a distributor 55 positioned some distance above the grate 18 in the combustion chamber 13. The conduit 50 is provided with a screw conveyor 56, the shaft of which projects through the shell 11 and carries thereon a pulley or gear 57.

Figure 3:
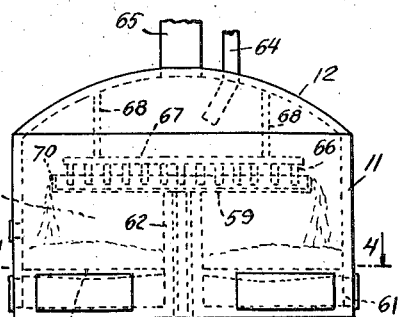
Fig. 3 is an elevation of a modified form of apparatus.
Figure 4:
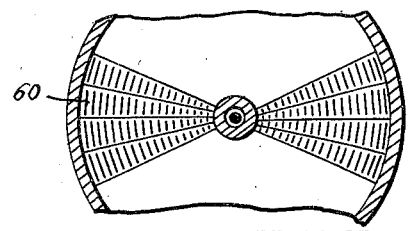
Fig. 4 is a horizontal section on the line 4—4 of Fig. 3.

In the modified form of the apparatus illustrated in Fig. 3, the arrangement is such that decomposition of acid sludge on the rotary hearth 59 is carried out in the presence of the hot combustion gases rising from the fuel burned on sector shaped grates 60. As in the apparatus of Fig. 1, air for supporting combustion on the grates is admitted through dampers in clean-out doors 61. The rotary hearth 59 is supported by a brick-work pillar 62 projecting upwardly through the center of the circular combustion chamber 63. Acid sludge or other material to be treated on the hearth is introduced into the furnace through an inlet pipe 64, the lower end of which is arranged to feed material substantially to the center of the hearth 59.

Gases evolved by decomposition taking place on the hearth together with the spent combustion gases are withdrawn from the furnace through the outlet conduit 65. A series of rabbles or plows 66 extend downwardly from a rack 67 held in the position indicated on the drawing by rods 68 connected to the top of the furnace. As in the arrangement of deflector 45 in the apparatus of Fig. 1, the lower ends of the plows 66 are spaced from the upper surface of the hearth 59 so as to permit the maintenance thereon of a bed of solid material. The plows 66 are pitched so as to gradually work solid residues of the decomposition reaction from the center towards the periphery of the hearth, and to discharge the solid matter over diametrically opposite edges of the vertical flange 70 and onto the fuel bed on the grates 60.

Processes constituting preferred embodiments of the invention may be carried out in conjunction with the two modifications of apparatus described substantially as follows. As noted, the invention is directed principally to the provision of heat treatments for the decomposition of waste acid sludges formed in numerous oil refining processes. When operating with apparatus such as illustrated in Fig. 1, a coal or coke fire is started on the grate 18. Hot combustion gases contact the underside of the left half of partition 17, and pass through the openings 23 into the chamber 25 surrounding the top of the muffle 28. The fire on the grate is controlled by suitable adjustment of the dampers in clean-out doors 20 so as to maintain temperatures in the muffle generally not substantially less than about 250° C., and preferably within the range 250–425° C.

Acid sludge, containing for example 45% sulphuric acid, free and combined 20% oils and tarry hydrocarbons and 35% water, is fed into the muffle through inlet 38. The material flows onto the hearth 32 at a point just beyond deflector 45, and decomposition of the sludge is thereupon initiated. The hearth 32 is rotated through gear 35 and shaft 36 in the direction of the arrow in Fig. 2 at a rate of about one revolution per 2–3 minutes. According to the preferred embodiment of the invention, the rate of feed of acid sludge and the rate of rotation of the hearth are so adjusted that decomposition of the sludge is substantially completed during one revolution of the hearth. The invention further contemplates the maintenance on the hearth of a bed of petroleum coke of a depth, for example from 2 to about 6 inches, the thickness of the coke bed being regulated, as previously noted, by the spacing between the lower edge of the scraper 45 and the upper surface of the hearth. When the process has progressed sufficiently to form on the hearth a bed of coke of such thickness that the upper surface of the bed contacts the lower edge of the deflector 45, coke is thereafter continuously discharged over the edge of the hearth into the hopper 48. Accordingly, after a coke bed of requisite thickness has been formed, and the rate of feed of acid sludge through inlet 38 and the rate of rotation of the hearth have been regulated as noted above, the process proceeds without interruption and is continuous both with respect to the sludge flowed onto the hearth and the discharge of coke therefrom. The maintenance of a bed of coke on the hearth is desirable principally to present a large irregular surface over which incoming sludge is distributed in the form of a substantially quiescent layer in which condition the sludge is exposed to the action of heat, and is readily decomposed. Furthermore, the coke bed prevents direct contact of acid sludge with the hearth and thus avoids undue corrosion thereof.

The decomposition reaction taking place on the hearth involves principally the reduction of sulphuric acid by the hydrogen of hydrocarbons and/or by carbonaceous matter contained in the sludge with the production of sulphur dioxide and petroleum coke. The gases generated by the reaction contain relatively large quantities of sulphur dioxide and water vapor, and smaller amounts of hydrocarbons, carbon monoxide, carbon dioxide, nitrogen, etc. The gaseous products of the decomposition of the sludge are withdrawn from the muffle through the outlet pipe 42, and may be passed through a cooler to lower the temperature of the gases to permit separation of condensable vapors from the gas stream. Since decomposition is carried out in the muffle substantially in the absence of air, burning of carbonaceous matter on the hearth is prevented and the gases discharged from the muffle will be relatively rich in sulphur dioxide. On cooling of the gas stream and separation therefrom of condensable vapor, the sulphur dioxide concentration is increased, and the gas mixture may be utilized directly where a concentrated sulphur dioxide gas is desired, or the gases may be further purified, diluted with air and employed in the manufacture of sulphuric acid, or the gases may be utilized in the production of elemental sulphur.

As noted, the coke formed by the decomposition reaction is continuously discharged from the hearth into hopper 48, and a sufficient quantity of coke is maintained therein to prevent escape of gases from the muffle through the hopper. A portion of the coke in the hopper is directed into the right end of the conduit 50, and the remainder into the upper end of the discharge chute 51. Operation of the conveyor 56 feeds coke substantially continuously over the surface of the distributor 55, and thence to the bed of fuel on grate 18 in the combustion chamber. The rate of rotation of the conveyor is so adjusted as to charge the necessary quantity of coke to the combustion chamber for the maintenance of the proper temperatures in the muffle 28. Coke produced by the decomposition reaction in excess of that required in the combustion chamber may be withdrawn from the hopper 48 through the chute 51 as one product of the process, and utilized as desired. Other fuels such as oil or natural gas may be burned in chamber 13, in which case all the coke produced may be withdrawn through outlet 51, and conduit 50 may be closed off or eliminated.

The general mode of operation of the process as carried out in the apparatus of Fig. 3 is, in many respects, similar to that described in connection with the apparatus of Fig. 1. However, the apparatus of Fig. 3 may be advantageously employed in instances where it is desired to obtain a gas having a sulphur dioxide concentration considerably less than in the preferred procedure above noted, and also in situations where the acid sludge is of such nature that it contains quantities of carbonaceous matter not materially in excess of that required for burning to supply heat required for decomposition in the reaction chamber. In the operation of the modified embodiment of the process, sludge acid is continuously fed substantially to the center of the hearth 59 through the inlet 64. During rotation of the hearth, sludge and residue are gradually worked toward the periphery of the hearth, and the rate of feed of sludge and rate of rotation of the hearth are adjusted so that decomposition of the sludge is substantially complete when the solid residue thereof reaches the edge of the hearth. Coke is continuously discharged over the flange 70 onto the fuel bed on grates 60, and burned to generate heat required for decomposition of the sludge.

The dampers in clean-out doors 61 are regulated so that substantially no more air is admitted to the furnace than is necessary for the substantially complete combustion of the coke on grates 60. Consequently the gases rising from the surface of the fuel bed contain little, if any, oxygen, and burning of carbonaceous residue on the hearth is thereby prevented. The gases formed by decomposition of the sludge admixed with the spent combustion gases are withdrawn from the furnace through the outlet 65. It will be evident that because of commingling in the furnace of the gaseous decomposition products of the sludge and the combustion gases, the sulphur dioxide content of the exit gas of the furnace is substantially less than that obtained when the process is carried out in apparatus such as shown in Fig. 1. Treatment of the gas mixture after discharge through outlet 65 may be the same as noted with respect to the gases withdrawn from muffle 28 in the apparatus of Fig. 1.

I claim:

1. The method of producing sulphur dioxide which comprises feeding sludge material derived from sulphuric acid treatment of petroleum onto a bed of carbonaceous matter movable through a reaction zone heated to a temperature sufficient to decompose the sludge, whereby a layer of sludge is formed on the bed of carbonaceous material, moving the bed quiescently through the reaction zone at a rate such that during the movement of the bed through the reaction zone the sludge is substantially decomposed, sulphur dioxide formed, and solid residual carbonaceous matter deposited on the bed of carbonaceous matter.

2. The method of producing a sulphur dioxide containing gas in a reaction involving the application thereto of extraneous heat which comprises continuously feeding sludge material derived from sulphuric acid treatment of petroleum onto a bed of carbonaceous matter movable through a reaction zone heated to a temperature sufficient to decompose the sludge, moving the bed quiescently with the sludge thereon through the reaction zone at a rate such that during the movement of the bed through the reaction zone the sludge on the bed is substantially decomposed to form a gas mixture containing sulphur dioxide and to leave solid residual carbonaceous matter on the bed, maintaining a fuel bed adjacent the reaction zone positioned and arranged to supply heat thereto, maintaining a bed of residual carbonaceous matter in the reaction zone, continuously discharging residual carbonaceous matter from such bed to the fuel bed, and burning the carbonaceous matter in the fuel bed to furnish heat required to decompose the sludge, decomposing the sludge by means of such heat whereby a gas mixture containing sulphur dioxide is produced and the decomposition reaction is maintained self-sustaining by the utilization of carbonaceous matter contained in the sludge.

3. The method of producing a sulphur dioxide containing gas in a reaction involving the application thereto of extraneous heat which comprises continuously feeding sludge material derived from sulphuric acid treatment of petroleum onto a bed of carbonaceous matter movable through a reaction zone heated to a temperature sufficient to decompose the sludge and from which oxygen is substantially excluded, moving the bed quiescently with the sludge thereon through the reaction zone at a rate such that during the movement of the bed through the reaction zone the sludge on the bed is substantially decomposed to form a gas mixture containing sulphur dioxide and leave solid residual carbonaceous matter on the bed, maintaining a fuel bed in indirect heat exchange relation with the reaction zone to supply heat thereto, maintaining a bed of residual carbonaceous matter in the reaction zone, discharging residual carbonaceous matter from such bed to the fuel bed and burning the carbonaceous matter in the fuel bed to furnish heat required to decompose the sludge, whereby a gas mixture containing sulphur dioxide is produced, and the decomposition reaction is maintained self-sustaining by the utilization of carbonaceous matter contained in the sludge.

4. The method of producing a sulphur dioxide containing gas in a reaction involving the application thereto of extraneous heat which comprises feeding sludge material derived from sulphuric acid treatment of petroleum onto a bed of carbonaceous matter movable through a reaction zone heated to a temperature sufficient to decompose the sludge, moving the bed quiescently with the sludge thereon through the reaction zone at a rate such that during the movement of the bed through the reaction zone the sludge on the bed is substantially decomposed to form a gas mixture containing sulphur dioxide and to leave solid residual carbonaceous matter on the bed, maintaining a fuel bed adjacent the reaction zone positioned and arranged to supply heat thereto, maintaining a bed of residual carbonaceous matter in the reaction zone, discharging at least a substantial portion of the residual carbonaceous matter from such bed to the fuel bed, burning the carbonaceous matter in the fuel bed to furnish heat required to decompose a further body of the sludge and decomposing the sludge by means of such heat, whereby a gas mixture containing sulphur dioxide is produced and the decomposition reaction is maintained self-sustaining by the utilization of carbonaceous matter contained in the sludge.

EDWIN J. MULLEN.